(12) United States Patent
Wend et al.

(10) Patent No.: US 11,352,212 B2
(45) Date of Patent: Jun. 7, 2022

(54) RETAINING ELEMENT FOR RETAINING AND CONVEYING AN OBJECT ALONG A CONVEYOR RAIL AND SUSPENDED CONVEYING SYSTEM HAVING A CONVEYOR RAIL AND SUCH RETAINING ELEMENTS

(71) Applicant: Dürkopp Fördertechnik GmbH, Bielefeld (DE)

(72) Inventors: Michael Wend, Bielefeld (DE); Thomas Johannesmann, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 0 days.

(21) Appl. No.: 17/175,080

(22) Filed: Feb. 12, 2021

(65) Prior Publication Data
US 2021/0253358 A1  Aug. 19, 2021

(30) Foreign Application Priority Data
Feb. 13, 2020 (DE) ...................... 10 2020 201 828.6

(51) Int. Cl.
*B65G 17/32* (2006.01)
*B65G 17/20* (2006.01)
*B65G 19/02* (2006.01)
*B65G 19/24* (2006.01)

(52) U.S. Cl.
CPC ........... *B65G 17/326* (2013.01); *B65G 17/20* (2013.01); *B65G 19/025* (2013.01); *B65G 19/245* (2013.01); *B65G 2201/0229* (2013.01); *B65G 2201/0238* (2013.01)

(58) Field of Classification Search
CPC .... B65G 17/326; B65G 17/20; B65G 19/025; B65G 19/245; B65G 2201/0229; B65G 2201/0238; B65G 47/28; B65B 17/323; B65B 17/32
USPC ........................................ 198/465.4
See application file for complete search history.

(56) References Cited

U.S. PATENT DOCUMENTS

| | | | |
|---|---|---|---|
| 4,939,999 A * | 7/1990 | Burt | B61J 3/00 104/89 |
| 5,799,769 A | 9/1998 | Heer et al. | |
| 6,431,347 B1 * | 8/2002 | Gossner | B61B 10/025 104/172.4 |
| 7,377,377 B2 * | 5/2008 | Christiansson | B61B 10/025 198/465.4 |

(Continued)

FOREIGN PATENT DOCUMENTS

| | | |
|---|---|---|
| DE | 4042375 A1 | 12/1991 |
| DE | 19614905 A1 | 11/1997 |

(Continued)

*Primary Examiner* — Mark A Deuble
(74) *Attorney, Agent, or Firm* — McGlew and Tuttle, P.C.

(57) ABSTRACT

A retaining element for retaining and conveying an object along a conveyor rail includes a carrier part having a width, including an entrainment element for the entrainment of the carrier part by a drive element and including a receiver for receiving the object to be conveyed, and a spacer lever which is pivotably articulated on the carrier part and which is displaceable between a resting position in which the spacer lever is arranged within the width of the carrier part and a working position in which the spacer lever protrudes in the width direction of the carrier part.

20 Claims, 10 Drawing Sheets

(56) References Cited

U.S. PATENT DOCUMENTS

| | | | |
|---|---|---|---|
| 8,561,787 B2 * | 10/2013 | Wend .................... | B61B 10/025 198/687 |
| 10,280,005 B2 * | 5/2019 | Stauber ................. | B65G 17/32 |
| 2012/0152697 A1 * | 6/2012 | Janzen ................... | B65G 17/32 198/680 |
| 2013/0192956 A1 | 8/2013 | Lahogue et al. | |

FOREIGN PATENT DOCUMENTS

| | | | | |
|---|---|---|---|---|
| DE | 19957852 A1 | 6/2001 | | |
| DE | 102005006455 A1 | 8/2006 | | |
| DE | 102011080280 A1 | 2/2013 | | |
| DE | 102010053590 B4 | 3/2019 | | |
| EP | 1549575 B1 | 2/2006 | | |
| EP | 1690811 A1 * | 8/2006 | ........... | B61B 10/025 |
| GB | 1 526 167 A | 9/1978 | | |
| WO | 99/33733 A1 | 7/1999 | | |

\* cited by examiner

RETAINING ELEMENT FOR RETAINING AND CONVEYING AN OBJECT ALONG A CONVEYOR RAIL AND SUSPENDED CONVEYING SYSTEM HAVING A CONVEYOR RAIL AND SUCH RETAINING ELEMENTS

CROSS-REFERENCES TO RELATED APPLICATIONS

This application claims the priority of German Patent Application, Serial No. 10 2020 201 828.6, filed Feb. 13, 2020, the content of which is incorporated herein by reference in its entirety as if fully set forth herein.

FIELD OF THE INVENTION

The invention relates to a retaining element for retaining and conveying an object along a conveyor rail and a suspended conveying system having a conveyor rail and such retaining elements.

BACKGROUND OF THE INVENTION

DE 10 2010 053 590 B4 discloses a conveying system for carrying bags. In order to permit an ordered backing-up of loaded carrying bags, so that conveyed goods which are conveyed in the carrying bags are kept substantially free of backing-up forces, it is provided to design on the carrying bag a spacer which is arranged between a suspension point of the carrying bag and the sack.

SUMMARY OF THE INVENTION

It is an object of the present invention to improve the ordered backing-up of loaded carrying bags.

The object is achieved according to the invention by a retaining element for retaining and conveying an object along a conveyor rail, wherein the retaining element comprises
a. a carrier part having a width, comprising
   i. an entrainment element for the entrainment of the carrier part by a drive element,
   ii. a receiver for receiving the object to be conveyed,
b. a spacer lever which is pivotably articulated on the carrier part and which is displaceable between a resting position in which the spacer lever is arranged within the width of the carrier part and a working position in which the spacer lever protrudes in the width direction of the carrier part.

The object is further achieved according to the invention by a suspended conveying system having at least one conveyor rail, a drive element, which is arranged, in particular, so as to be integrated in the conveyor rail, and a plurality of retaining elements.

According to the invention, it has been recognized that an improved backing-up of loaded carrying bags is possible when a spacer lever is arranged not on the carrying bag but on a retaining element. In particular, the spacer lever is a component of the retaining element. A retaining element is, in particular, a roll adapter as is disclosed in principle in DE 10 2005 006 455 A1. The retaining element serves for retaining and conveying an object, in particular a carrying bag, along a conveyor rail. The retaining element, however, also permits a retaining and conveying of a plurality of objects, in particular a plurality of carrying bags.

The retaining element comprises a carrier part having a width. The width extends, in particular, in the direction of conveyance of the retaining element. The direction of conveyance is predetermined, in particular, by the conveyor rail along which the retaining element is conveyed. The carrier part is designed, in particular, in one piece. The carrier part comprises an entrainment element. The entrainment element is arranged, in particular, in a region of the upper end of the carrier part. In particular, during the operation of the suspended conveying system the entrainment element is arranged inside the conveyor rail in order to cooperate mechanically with the drive element. The entrainment element serves for the entrainment of the carrier part by a drive element, in particular a drive chain. The drive element is arranged, in particular, in and/or on the conveyor rail of a suspended conveying system and/or fastened in and/or on the conveyor rail and/or integrated therein. The carrier part also comprises a receiver. The receiver serves for receiving the object to be conveyed. The receiver is designed, in particular, as a receiver opening. The receiver is arranged, in particular, in a region of a lower end of the carrier part. The region which is remote from the conveyor rail, when the retaining element is arranged for retaining and conveying objects on the conveyor rail, is understood as the lower end of the carrier part. The lower end of the carrier part forms, in particular, a lower end portion of the carrier part.

The spacer lever is pivotably articulated on the carrier part. In particular, the spacer lever is pivotably articulated about a pivot axis. The pivot axis is oriented, in particular, parallel to a roller axis. One or more rollers may be arranged about the roller axis, so as to be rotatably mounted on the carrier part in order to permit the retaining element to roll along the conveyor rail. A displacement of the retaining element along the conveyor rail in the direction of conveyance is ensured by the rolling and thus with a reduced force expenditure. The spacer lever is displaceable, in particular foldable, between a resting position and a working position. The resting position is a standard position. The working position is a spaced-apart position. In the resting position the spacer lever is arranged within the width of the carrier part. This means that the spacer lever does not protrude in the width direction of the carrier part. The standard position characterizes the typically present normal state of the spacer lever. In the standard position the retaining element permits a space-saving conveyance and arrangement of the objects to be conveyed. It is conceivable, in particular, that with the spacer lever in the standard position the width of the carrier part is smaller than the width of the object to be conveyed. In particular, objects of variable thickness may be compensated relative to one another in the direction of conveyance of the conveyor rail. In each case, the width direction of the carrier part and the object are oriented parallel to the direction of conveyance predetermined by the conveyor rail. In the working position, the spacer lever protrudes in the width direction of the carrier part. The spaced-apart position represents a non-normal state of the retaining element. The non-standard state only occurs exceptionally during operation of a suspended conveying system and, in particular, as an isolated case. By the spaced-apart position the spacing between two adjacent retaining elements may be set in a reliable manner and at a spacing which may be fixed.

As the spacer lever is articulated on the carrier part, it is ensured that adjacent retaining elements are arranged in a backed-up arrangement with a defined spacing from one another. Individual retaining elements colliding and, in particular, being pushed on top of one another in the conveyor rail is thus reliably eliminated. The spacer lever acts directly where the retaining elements are handled, i.e. subjected to the conveying force for conveying the retaining elements. The spacer lever according to the invention acts directly, i.e. in a direct manner.

An embodiment of the spacer lever, wherein the spacer lever is arranged in the resting position and in the working position in each case in a stable manner on the carrier part, permits the spacing between two adjacent retaining elements, in particular between two adjacent objects, to be ensured in a reliable manner. In particular, the spacer lever is arranged in each case in a self-securing manner on the carrier part in the resting position and in the working position. An inadvertent displacement of the spacer lever from the resting position or from the working position is reliably prevented.

A force storage element which is articulated at a first point of articulation on the spacer lever and at a second point of articulation on the carrier part, in particular in each case pivotably, simplifies the reliable arrangement of the spacer lever into the resting position and into the working position. In particular, the force storage element is articulated pivotably on the spacer lever and/or pivotably on the carrier part.

A spring element, in particular a coil spring, as the force storage element permits an uncomplicated design of the retaining element. In particular, the spring element permits a transfer of the spacer lever into the resting position and into the working position which in each case is reliable.

Alternatively, the spacer lever with the force storage element may be designed as a safety bolt with a spring ring or as a linchpin. The folding up of the spacer lever from the standard position into the spaced-apart position and back again is simplified thereby. Safety bolts with a spring ring or linchpin are available cost-effectively as standardized, in particular standard, components. The design of such a retaining element is uncomplicated and cost-effective. The force storage function in the safety bolt with the spring ring or in the linchpin is inherently, i.e. implicitly, present. Additional components are avoided. The total number of components is reduced.

An arrangement of the spring element in the resting position and in the working position in each case in an over dead-centre position, simplifies the self-securing arrangement of the spacer lever.

A design of the retaining element configured such that the points of articulation and the pivot axis form in the resting position and in the working position the vertices of a resting position triangle and/or a working position triangle in a plane perpendicular to the pivot axis, is structurally uncomplicated.

At least one rotatable roller which is rotatably articulated about a rotational axis on the carrier part, permits the conveyance of the retaining element along the conveyor rail with a reduced force expenditure.

The design of the receiver in particular, as a closed opening which is oriented, in particular, transversely and, in particular, perpendicular to the direction of conveyance, is uncomplicated and reliable. An inadvertent release of the conveyed object from the retaining element is eliminated. The opening of the receiver is oriented substantially perpendicular to the direction of conveyance. Alternatively, it is conceivable that the receiver is designed as a frame-like opening, wherein the frame may have at least one interruption along its periphery. The frame is then designed to be open.

An identification means according to the invention serves for improved tracking of the retaining element and, in particular, of the object conveyed by means of the retaining element in the suspended conveying system. The carrier part has an identification element, in particular an RFID chip.

A bearing surface which serves for a defined bearing of the spacer lever of a further retaining element, improves a controlled bearing of the adjacent retaining element. The bearing surface serves for the bearing of the spacer lever of an adjacent retaining element. The bearing surface has, in particular, a contour which corresponds to a contour of the spacer lever of the adjacent retaining element in a free end portion.

The design of the spacer lever configured such that the spacer lever in a free end region has a contact surface for bearing against the bearing surface of the adjacent retaining element, improves the defined bearing of the spacer lever on an adjacent retaining element.

A suspended conveying system having at least one conveyor rail, a drive element, which is arranged, in particular, so as to be integrated in the conveyor rail, and a plurality of retaining elements, has substantially the advantages of the retaining elements, reference being made thereto. In the suspended conveying system a secure and defined backing-up of objects, in particular of carrying bags, is ensured. In particular, a backing-up force which acts due to insufficient spacing between adjacent carrying bags and which leads to the retaining elements overlapping in the conveyor rail in the direction of conveyance is eliminated. The suspended conveying system ensures an unimpeded backing-up and further conveyance of the retaining elements and of the objects being retained and conveyed thereon.

An opening station for transferring the spacer lever into a spaced-apart position, wherein the opening station, in particular, has an opening element which cooperates directly with the spacer lever, simplifies the displacement of the spacer lever into the spaced-apart position. In particular, the opening station permits an uncomplicated and immediate folding up of the spacer lever into the spaced-apart position. In particular when conveyed in the direction of conveyance, the spacer lever is transferred automatically, in particular, from the standard position into the working position by cooperation with an opening element of the opening station. The opening element, in particular, is a static element. The opening element acts passively. The opening element, in particular, is designed as a fixed sliding surface. The opening element, in particular, is arranged in the region of the conveyor rail and, in particular, fastened to the conveyor rail. The fastening of the opening element to the conveyor rail may be carried out integrally or by means of a fastening element such as fastening screws.

A closing station for transferring the spacer lever into a standard position, wherein the closing station, in particular, has a closing element which cooperates directly with the spacer lever, permits an uncomplicated displacement of the spacer lever, i.e. the transfer of the spacer lever, in particular, from the spaced-apart position into the standard position. In particular, the transfer of the spacer lever into the closed position takes place automatically by the cooperation of the spacer lever with a closing element when the spacer lever is conveyed in the direction of conveyance. The closing element, in particular, is a static element. The closing element acts passively. The closing element is designed, in particular, to be fixed in the suspended conveying system. The closing element, in particular, is a fixed sliding surface. The closing element is arranged, in particular, in the region of the conveyor rail and, in particular, fastened to the conveyor rail. The fastening of the closing element to the conveyor rail may be carried out integrally or by means of a fastening element, such as screws.

Both the features specified in the claims and the features specified in the following exemplary embodiment of the retaining element according to the invention are in each case suitable individually or in combination with one another for developing the object according to the invention. The respective combinations of features regarding the developments of the inventive object do not constitute a limitation but are substantially merely of an exemplary nature.

Further features, advantages and details of the invention are disclosed in the following description of an exemplary embodiment with reference to the drawing.

DESCRIPTION OF THE PREFERRED EMBODIMENT

A suspended conveying system 1, not shown in more detail in FIGS. 1 to 7, comprises at least one conveyor rail 2 which predetermines a direction of conveyance 3. Depending on the embodiment of the conveyor rail 2, the direction of conveyance 3 is linear, at least in some sections. The direction of conveyance 3 may have a curvature, at least in some sections. In particular, relative to the horizontal the direction of conveyance 3 may be designed to be inclined upwardly or downwardly or to be curved, at least in some sections, in order to overcome height differences in the suspended conveying system 1.

The conveyor rail 2 is configured as a hollow box profile. A drive element, not shown, in the form of a drive chain is arranged in the conveyor rail 2, said drive chain being drivable in the direction of conveyance 3 by means of drive means, not shown. The drive chain may be designed, in particular, in the form of a so-called roller chain, which has rollers which are connected together at a small spacing from one another by means of connecting plates. The bolts which connect the rollers may have bolt-shaped extensions which protrude downwardly and which serve as entrainment elements. The bolts together with the entrainment elements run perpendicular to the conveyor rail 2 in a vertical plane spanned by the direction of conveyance 3. The drive chain is guided and retained in the conveyor rail 2 in the direction of the bolts, i.e. perpendicular and transversely to the direction of conveyance 3.

Relative to the construction and the function of the drive chain, reference is expressly made to DE 10 2005 006 455 A1.

Retaining elements 4 which are movable by means of the drive element in the conveyor rail 2 in the direction of conveyance 3 are also provided.

Two guide webs 6 are configured on a lower face 5 of the conveyor rail 2 so as to be oriented toward one another, a slot 7 extending therebetween in the direction of conveyance 3 of the conveyor rail 2. The slot 7 is defined by the two guide webs 6 in a direction transversely and, in particular, perpendicularly to the direction of conveyance 3.

A flat carrier part 8 of each retaining element 4 protrudes downwardly through the slot 7 out of the conveyor rail 2. In the region of its upper end 9 the retaining element 4 has on both sides of the carrier part 8 one respective roller 10, which in each case are rotatably mounted about a rotational axis 11 on the carrier part 8. The rollers 10 are displaceable in the direction of conveyance 3 in the conveyor rail 2. In particular, the rollers 10 are supported in each case on one of the guide webs 6. Thus only one pair of rollers 10 is present, wherein the rotational axis 11 for the two rollers 10 is identical. The retaining element 4 may oscillate about the rotational axis 11 in the rail 2.

The carrier part 8 has in the region of a lower end 12 a receiver 13 into which a hook of an object, in particular a carrying bag or a coat hanger, may be suspended. As a result, the object is retained reliably and captively on the retaining element 4. The retaining element 4 serves for the retaining and, in particular, the suspended conveyance of the object. The receiver 13 is designed as a closed receiver opening. The outer contour of the receiver opening is substantially triangular. Other contours are also conceivable. In particular, an open contour of the receiver opening is also possible. The receiver 13 is arranged so as to be inclined at an inclination angle n relative to a vertical plane oriented perpendicular to the direction of conveyance 3.

The retaining element 4 has an identification element 14 which is a transponder, in particular an RFID chip, a barcode and/or a bar code. The identification element 14 runs according to the arrangement of the plate-like carrier part 8 in the direction of conveyance 3, i.e. the identification element is located with its main surface open transversely to the direction of conveyance 3, i.e. to the side. Thus the identification element may be detected clearly via an identification device since it is not overlapped by other identification elements 14.

After being suspended in the retaining element 4, an object to be transported remains on this retaining element 4 during the entire transport process and is thus "wedded" thereto, so to speak. The object to be transported is controlled via the identification element 14 and thus the retaining element 4. Since the entire transport process is carried out from the drive chain, it is advantageous if the retaining element 4 adopts an absolutely precise position relative to the drive chain when transported. The following features serve to achieve this effect:

Above the rollers 10, the conveyor rail 2 has horizontal defining webs 15 which are oriented toward one another and which define a slot 16 therebetween. A stalk-like lug 17 of the retaining element 4 which is configured integrally with the carrier part 8 on the upper end 9 thereof extends through this slot 16. A stop 18 in the form of a transverse bolt is configured at the upper end of the stalk-like lug 17, the extent of said stop horizontally and transversely to the direction of conveyance 3 being greater than the width of the slot 16 so that when the retaining element 4 is inclined relative to the conveyor rail 2, the stop 18 comes to bear against the defining webs 15 and thus the retaining element 4 is prevented from being inclined further. The lug 17 and the stop 18 have the basic shape of a hammer.

The entrainment elements of the drive chain extend as far as directly above the defining webs 15 so that a retaining element 4 located between two entrainment elements is always reliably entrained, i.e. the retaining element does not come out of engagement with the entrainment element. In particular, two adjacent retaining elements 4 do not bear against one another in their most inclined position. In this context, it should be mentioned that adjacent retaining elements 4 are arranged at least with a double spacing of two adjacent entrainment elements in the conveyor rail 2. In order to ensure this, a width b of the retaining elements 4 in the direction of conveyance 3 is greater than a centre-to-centre spacing of adjacent entrainment elements of the drive chain.

A spacer lever 19 is pivotably articulated about a pivot axis 20 on the carrier part 8. The pivot axis 20 is oriented, in particular, parallel to the rotational axis 11. A force storage element 21 in the form of a coil spring is arranged between the carrier part 8 and the spacer lever 19. The force storage element 21 is pivotably articulated at a first point of articulation 22 on the spacer lever 19. The force storage element 21 is pivotably articulated at a second point of articulation 23 on the carrier part 8. The line of action of the force storage element is illustrated by a dashed-dotted line 24.

In the region of the pivot axis 20 the spacer lever 19 encompasses the carrier part 8 on either side along the pivot axis 20. In this region, the spacer lever 19 is designed in the manner of a link plate. The spacer lever 19 is designed to be substantially tubular at a free end region 25 remote from the pivot axis 20. In particular, the spacer lever 19 along the pivot axis 20 in the free end region 25 has a transverse extent q which is greater than the width B of the conveyor rail 2. The spacer lever 19 protrudes to the side below the conveyor rail 2 in the direction of the pivot axis 20.

A contact surface 26, which is located on an adjacent retaining element for bearing the spacer lever 19, is provided at the end region 25 of the spacer lever 19.

The carrier part 8 has a bearing surface 27 in the region of the lower end 12.

The bearing surface 27 serves for bearing a spacer lever 19 of an adjacent retaining element 4, in particular of the retaining element 4 arranged upstream in the direction of conveyance 3, i.e. of the trailing retaining element 4. According to the exemplary embodiment shown, the bearing surface 27 is designed as a trough-shaped recess on an outer face of the carrier part 8, which is located to the front, in particular in the direction of conveyance 3. The contour of the bearing surface may also be designed as a different shape. It is essential that the respective outer contour of the contact surface 26 and the bearing surface 27 correspond to one another so that the spacer lever 19 of a retaining element 4 is arranged reliably and securely in the bearing surface 27 of the adjacent retaining element 4.

Figure 1:
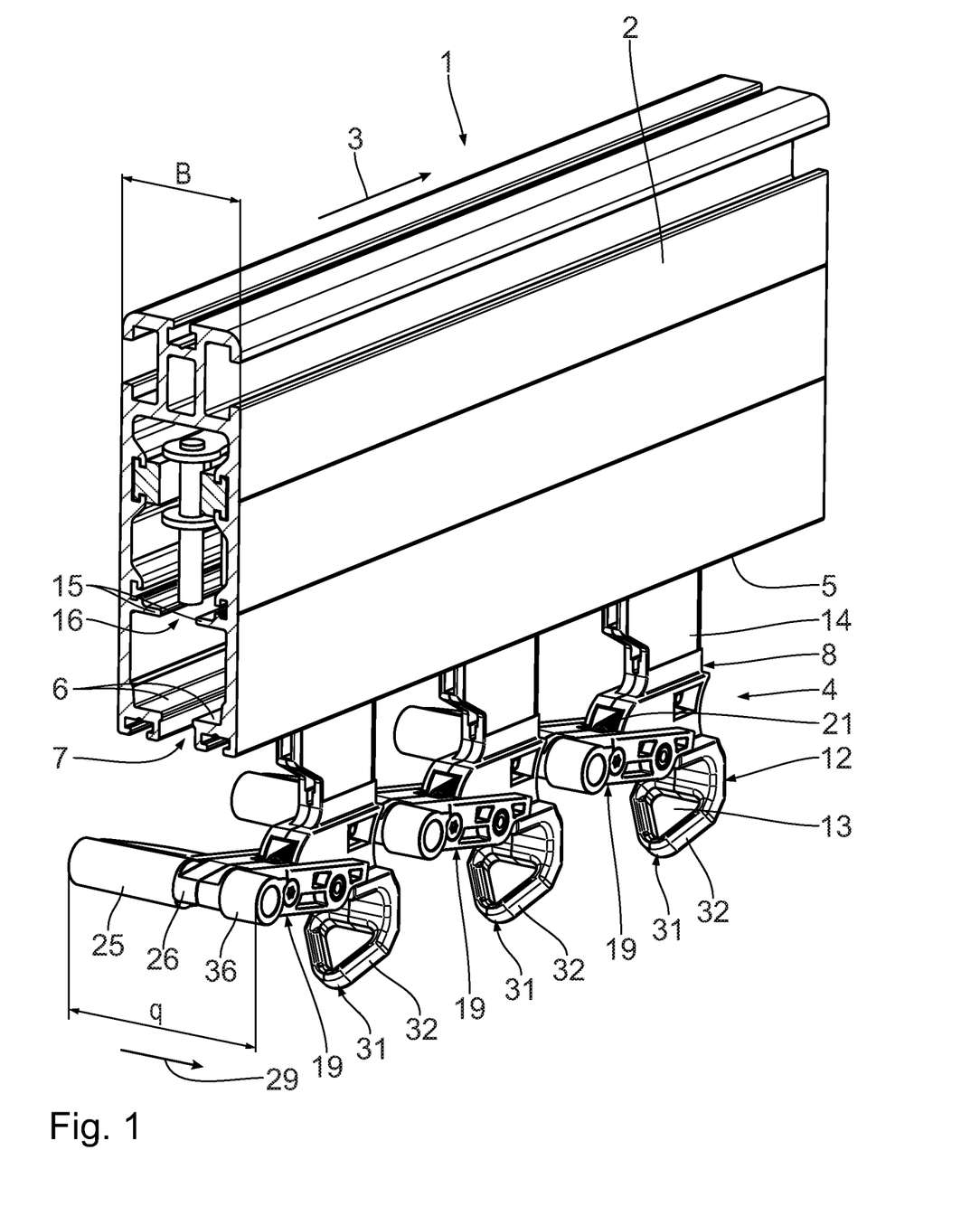
FIG. 1 shows a perspective detailed view of a conveyor rail of a suspended conveying system with a plurality of retaining elements according to the invention.
Figure 2:
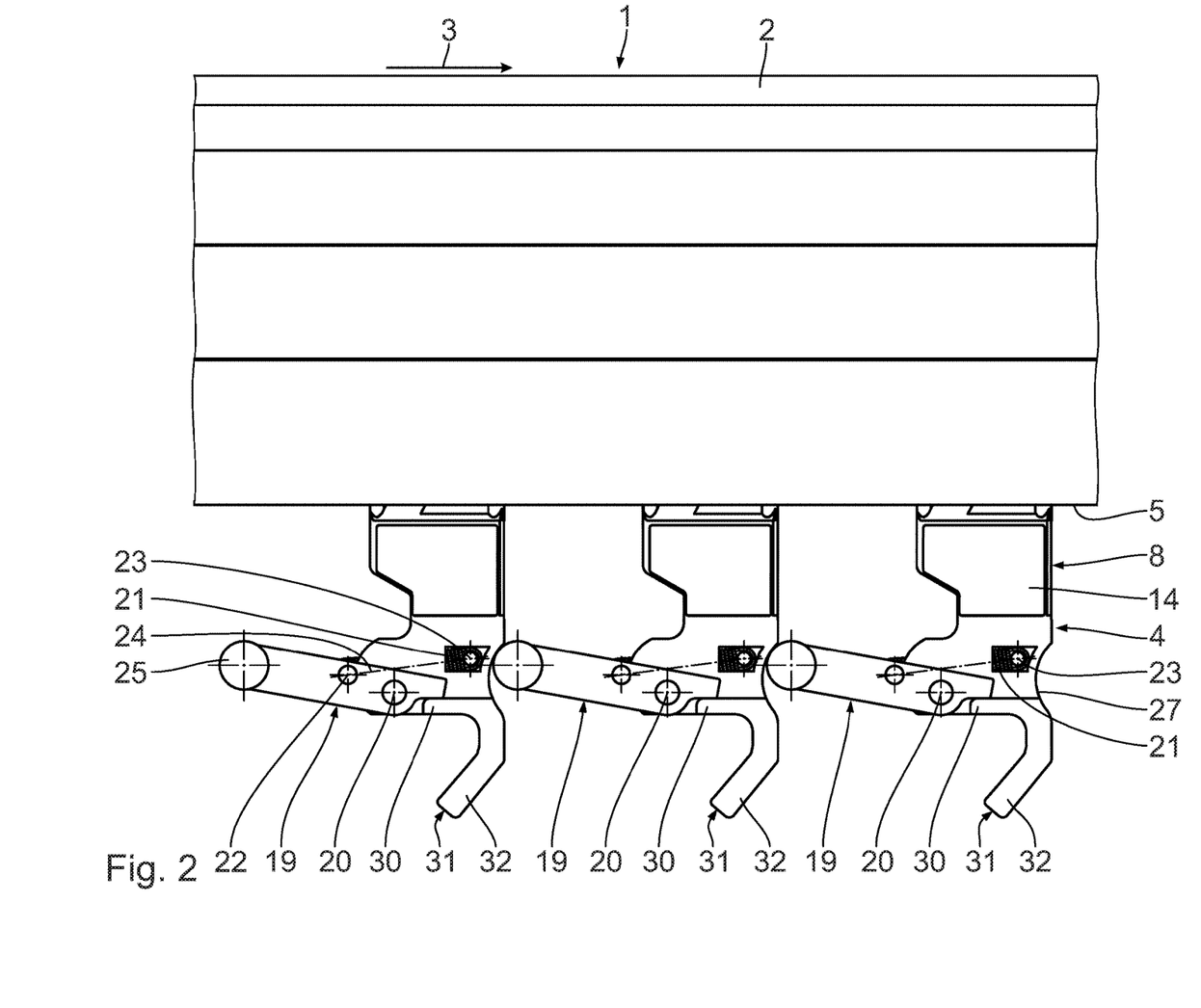
FIG. 2 shows a side view corresponding to FIG. 1.
Figure 3:
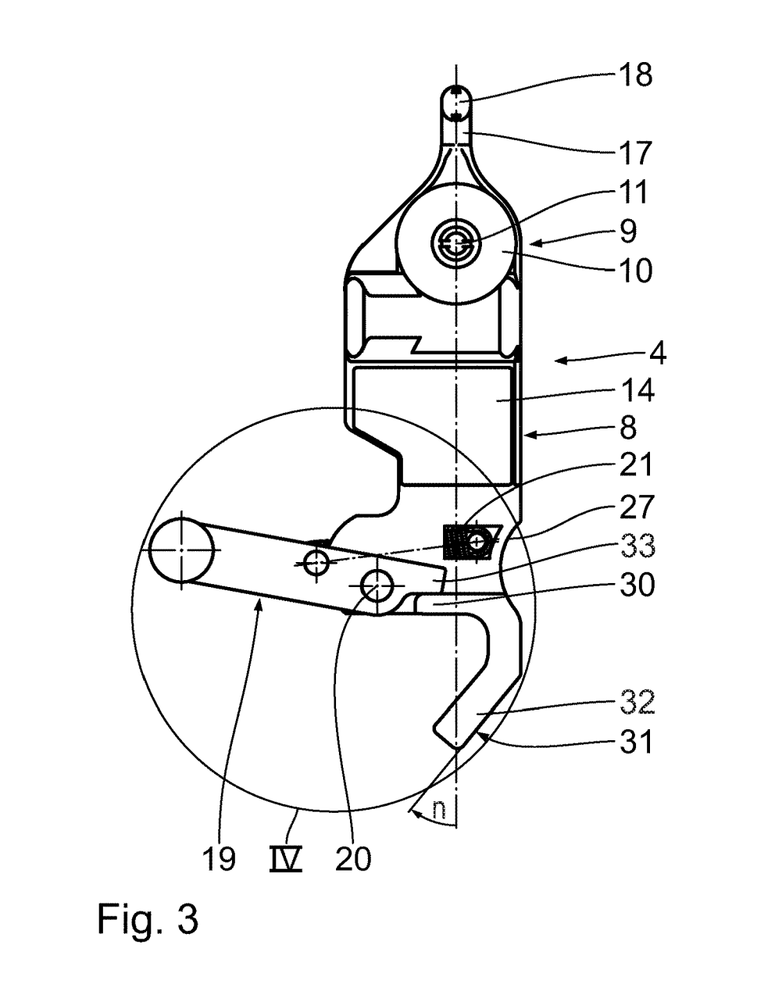
FIG. 3 shows a side view corresponding to FIG. 2 of a retaining element with a spacer lever in a working position.
Figure 4:
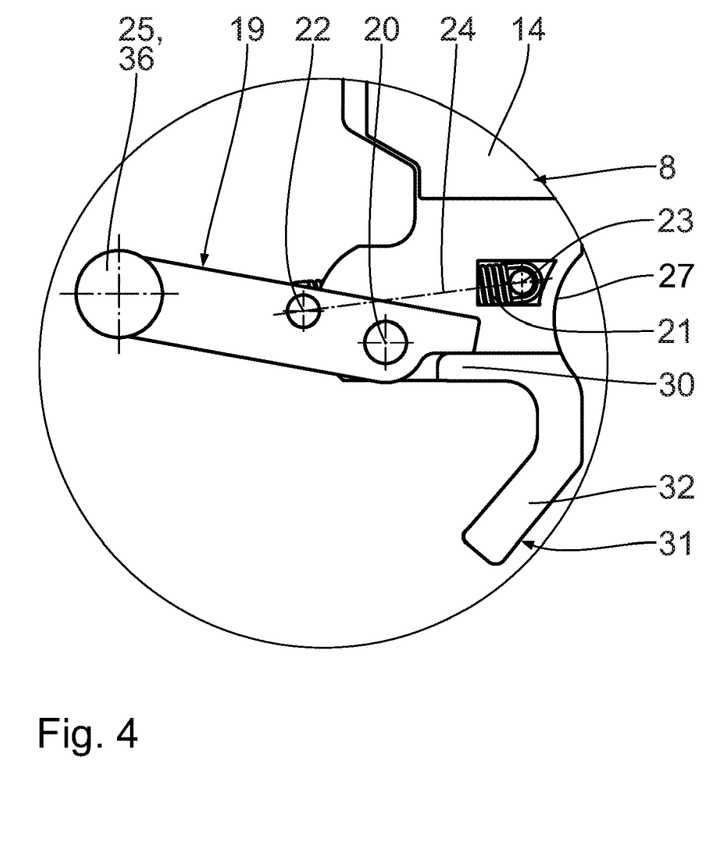
FIG. 4 shows an enlarged detailed view of the detail IV in FIG. 3.
Figure 5:
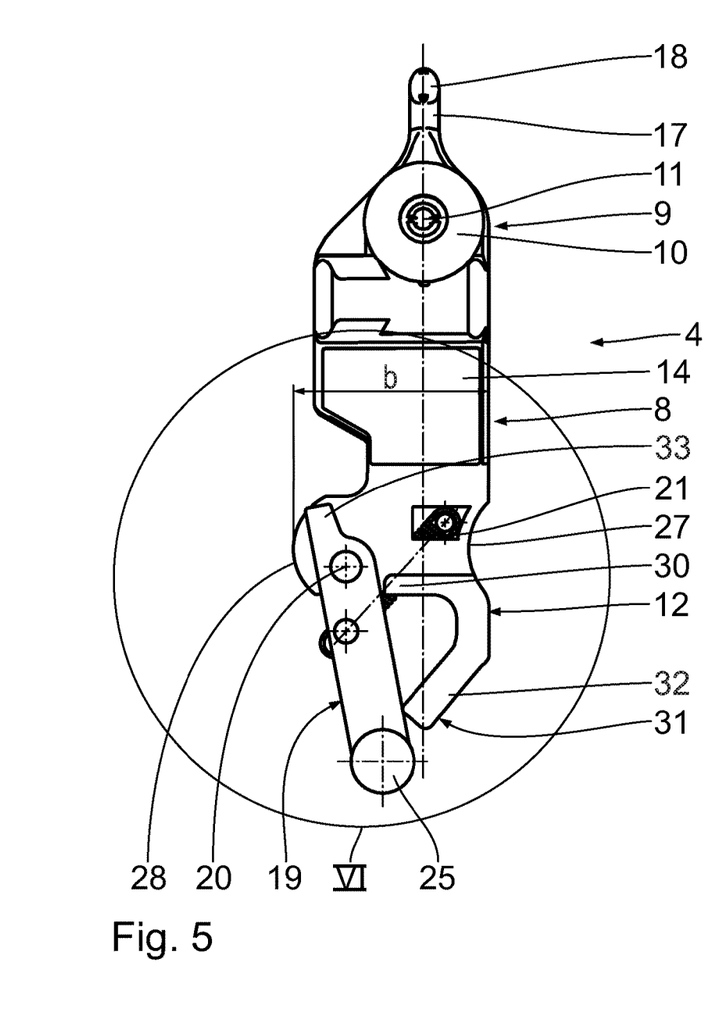
FIG. 5 shows a view of the retaining element corresponding to FIG. 3 with the spacer lever in a resting position.
Figure 6:
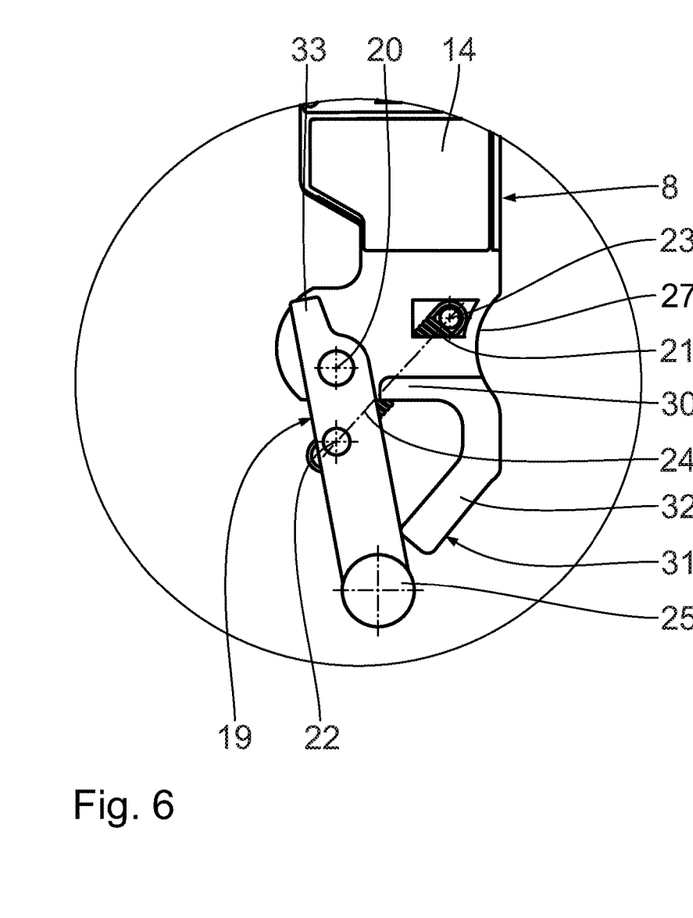
FIG. 6 shows an enlarged detailed view of the detail VI in FIG. 5.
Figure 7:
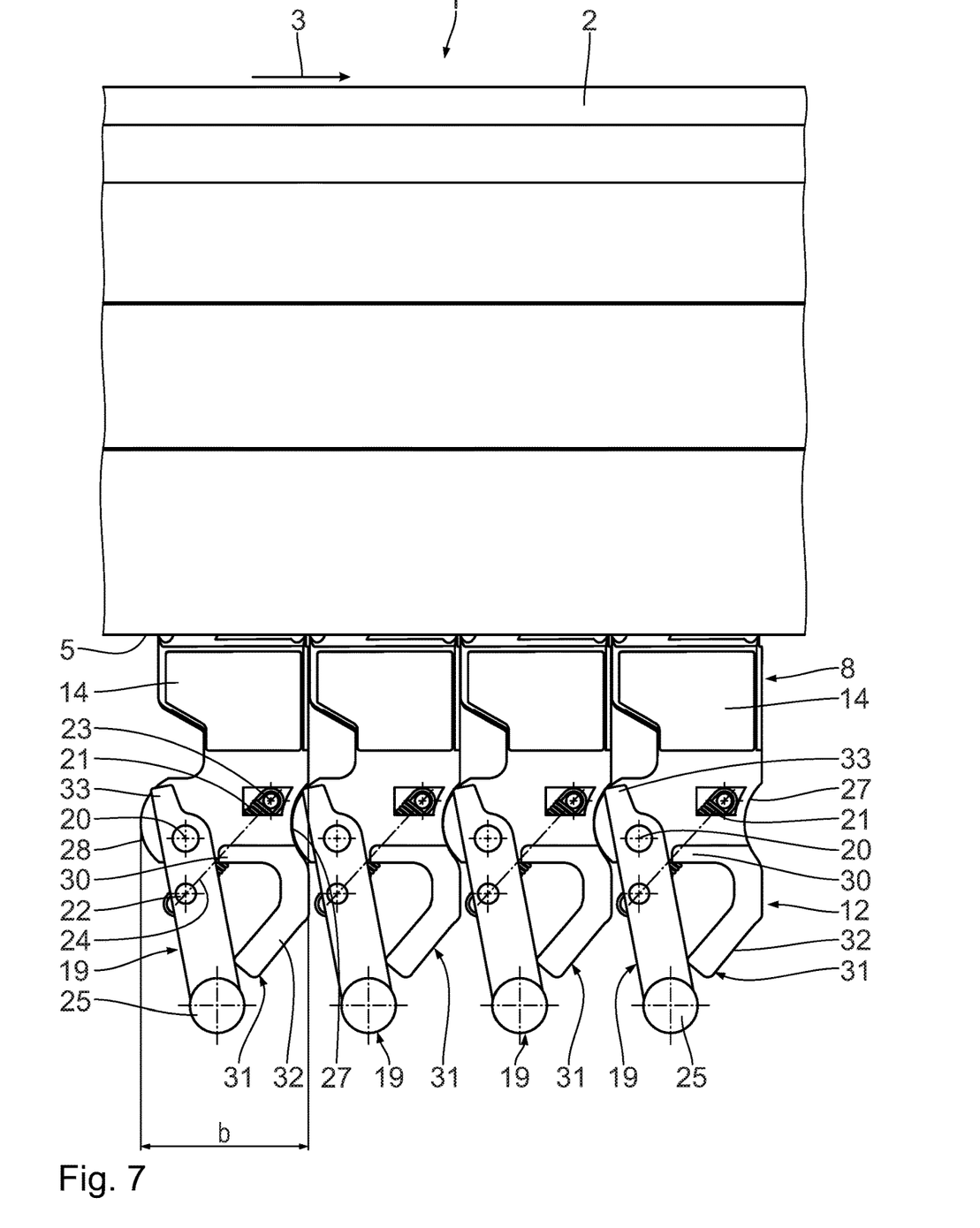
FIG. 7 shows a view corresponding to FIG. 2 with a plurality of retaining elements arranged adjacent to one another with the spacer levers in the resting position.

The spacer lever 19 may be displaced, in particular pivoted, between a working position according to FIGS. 1 to 4 and a transport position according to FIGS. 5 to 7.

In the working position the spacer lever 19 protrudes over the carrier part 8 in the width direction. In the working position the spacer lever is oriented substantially parallel to the direction of conveyance 3. Substantially parallel means that an angular deviation of at most +/−15°, in particular of at most +/−10° and in particular of at most +/−5° is possible relative to the direction of conveyance 3. In particular, the angular deviation is at most +/−2° and, in particular, exactly parallel. In the working position the spacer lever 19 is arranged with the end region 25 spaced apart to a maximum extent from a second stop element 31. In the working position the spacer lever 19 bears with an integrally formed protruding portion 33 against a first stop element 30. The protruding portion 33 is arranged at an end located opposite the end region 25 of the spacer lever 19. The second stop element 31 is designed, in particular, integrally with a frame 32 surrounding the receiver 13.

In the resting position, the spacer lever 19 is oriented substantially perpendicular to the direction of conveyance 3. Substantially perpendicular means that the angle at which the spacer lever 19 is arranged in the resting position relative to the direction of conveyance 3 is between 80° and 120°, in particular between 85° and 115°, in particular between 87° and 113°, in particular between 88° and 112° and in particular exactly 110°. In the resting position the spacer lever 19 is oriented substantially vertically. In the resting position the spacer lever 19 is arranged within the width b of the carrier part 8, as shown in FIG. 5. In the resting position the spacer lever 19 does not protrude in the width direction of the carrier part 8.

In the resting position the spacer lever 19 may bear, in particular, against the second stop element 31. It is also conceivable that in the resting position the spacer lever 19 is arranged spaced apart from the carrier part 8 and/or from the second stop element 31.

As is disclosed, in particular, in FIG. 4 and FIG. 6, the points of articulation 22, 23 and the pivot axis 20 form both in the resting position and in the working position the vertices of a resting position triangle and/or a working position triangle in a plane perpendicular to the pivot axis 20. The plane oriented perpendicular to the pivot axis corresponds in each case to the drawing plane in FIG. 4 and FIG. 6. The force storage element 21 is located both in the resting position and in the working position in each case in an over dead-centre position. The over dead-centre position is provided in a pivoting position in which the pivot axis 20 is located on the line of action 24. The restoring force produced by the force storage element 21 is at a maximum in this pivoted position. The spacer lever 19 is arranged both in the resting position and in the working position in each case in a stable, in particular self-securing, manner on the carrier part 8.

The stop elements 30, 31 are provided on the spacer lever 19 and/or on the carrier part 8. The stop elements 30, 31 prevent the spacer lever 19, in particular, from being pivoted beyond the over dead-centre position, beyond the working position and/or beyond the resting position relative to the carrier part 8.

The first stop element 30 serves for securing the over dead-centre position in the working position. The first stop element 30 is designed integrally as a lateral thickening on the carrier part 8. The first stop element 30 extends along the pivot axis 20, i.e. in the transverse direction 29 of the carrier part 8. The first stop element 30 may also be mounted as an additional component at the side on the carrier part 8.

The second stop element 31 is formed by a rear end of the frame 32 of the receiver 13 in the direction of conveyance 3. The second stop element 31 is designed integrally on the carrier part 8. A separate component is unnecessary for the second stop element 31.

The stop elements 30, 31 are arranged in each case in an end region of the C-shaped frame 32 according to FIG. 4.

The carrier part 8 has a raised portion 28 which is oriented in the width direction on a side opposing the bearing surface 27, in particular in the region of the pivot axis 20. The raised portion has, in particular, an outer contour which corresponds to the negative contour of the bearing surface 27. In an arrangement of the retaining elements 4 in the resting position according to FIG. 7, a retaining element 4 with the raised portion 28 may be arranged in the trough-shaped bearing surface 27 of the adjacent retaining element 4 in a stable and space-saving manner.

The function of the retaining elements 4, in particular the spacer levers 19, is described in more detail hereinafter.

Starting from the arrangement of the spacer lever 19 on the carrier part 8 in the resting position according to FIGS. 5 to 7, objects may be conveyed with the retaining elements 4 in the conveyor rail 2 in the suspended conveying system 1. In particular, as shown in FIG. 7, the retaining elements 4 may be arranged in a space-saving manner and tightly adjacent to one another in the substantially horizontally arranged conveying and/or backing-up portions of the suspended conveying system 1 in which the objects are suspended and conveyed, whilst if necessary being backed up on substantially horizontally oriented backing-up portions.

In particular, in the region of the backing-up portions with the conveyor rails 2 arranged inclined downwardly relative to the horizontal direction, the spacer levers 19 of the retaining elements 4 are pivoted on the carrier part 8 from the resting position into the working position shown in FIGS. 1 to 4. In particular, starting from FIG. 7 the retaining elements 4 are pivoted by approximately 90° in the clockwise direction about the pivot axis 20. In the working position a retaining element 4 with the spacer lever 19 is reliably supported on the adjacent retaining element 4 arranged upstream in the direction of conveyance 3, i.e. the trailing retaining element 4. As the spacer lever 19 is arranged with the contact surface 26 on the bearing surface 27 of the adjacent retaining element 4, the position is particularly stable. An inadvertent displacement of the spacer lever 19 is eliminated, in particular, due to the self-securing arrangement in the working position.

As the spacer lever 19 in the end region 25 protrudes in the transverse direction 29 over the conveyor rail 2, the spacer lever 19 may be pivoted from the resting position into the working position by means of a mechanism, not described in more detail, in particular in an automated manner. When the retaining elements 4 along the suspended conveying system 1 leave the inclined backing-up portion and, in particular, are conveyed along a substantially horizontally oriented conveying portion of the suspended conveying system 1, the spacer levers 21 may be acted upon by a corresponding folding mechanism and pivoted back into the resting position.

The construction of an opening station 34 of the suspended conveying system 1 is described in more detail hereinafter with reference to FIGS. 8 to 12.

The opening station 34 is part of the suspended conveying system 1. The opening station 34 serves for opening the spacer lever 19, i.e. for transferring the spacer lever 19 into the working position shown in FIG. 12.

The opening station 34 comprises an opening element 35 which is designed as a fixed sliding surface. In particular, the opening element 35 is connected to the conveyor rail, not shown in FIGS. 8 to 12, in particular fastened thereto. The opening element 35 is arranged adjacent to the carrier part 8 relative to the transverse direction 29, which is oriented perpendicular to the drawing plane according to FIGS. 8 to 12. The lateral spacing of the opening element 35 in the transverse direction 29 is selected such that, when the carrier part 8 is conveyed in the direction of conveyance 3, the spacer lever 19 with a laterally protruding portion 36 of the end region 25 comes into contact with the opening element 35.

The opening element 35 has a guide surface 37 which faces the lateral portion 36. The guide surface 37 has a vertical component according to a vertical plane which is oriented perpendicular to the transverse direction 29 and corresponds to the drawing plane according to FIG. 8. The guide surface 37 is oriented transversely to the direction of conveyance 3. The guide surface 37 is designed to rise in the direction of conveyance 3. According to the exemplary embodiments shown, the guide surface 37 is designed with a first inclination angle $n_1$ relative to the direction of conveyance 3. The first inclination angle $n_1$ is, in particular, between 10° and 50°, in particular between 15° and 45°, in particular between 20° and 40°, in particular between 25° and 35° and in particular 30°.

The guide surface 37 may also be designed to be non-linear, in particular curved, in particular progressively or degressively curved in the direction of conveyance 3.

The opening element 35 has an upper end 38 which defines the guide surface 37. The upper end 38 forms the highest point of the opening element 35 relative to the vertical direction 39. The upper end 38 is arranged in the vertical direction 39 such that the spacer lever 19, when it bears with the end region 25 against the upper end 38, is located in an over dead-centre position which is turned toward the spaced-apart position of the spacer lever 19.

The function of the opening station 34 is described in more detail hereinafter with reference to FIGS. 8 to 12.

Figure 8:
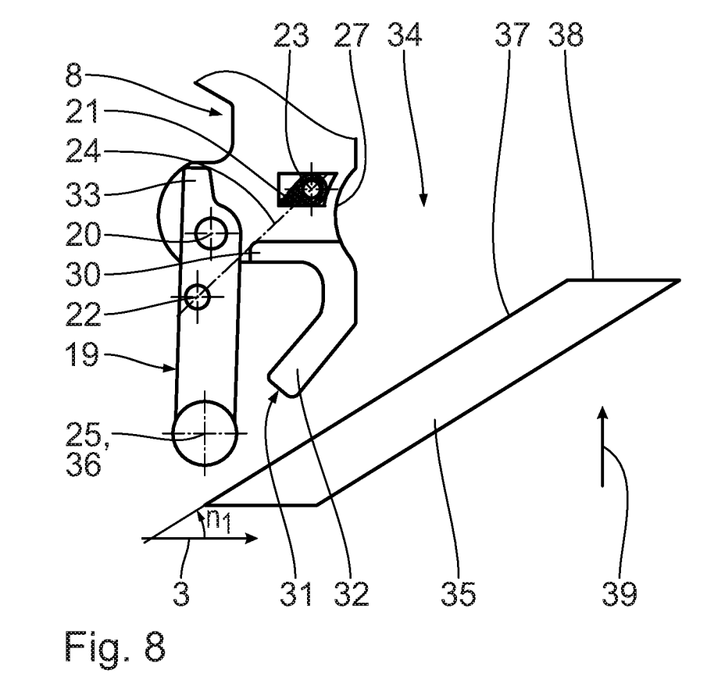
FIGS. 8 to 12 show schematic side views of an opening station of the suspended conveying system.
Figure 9:
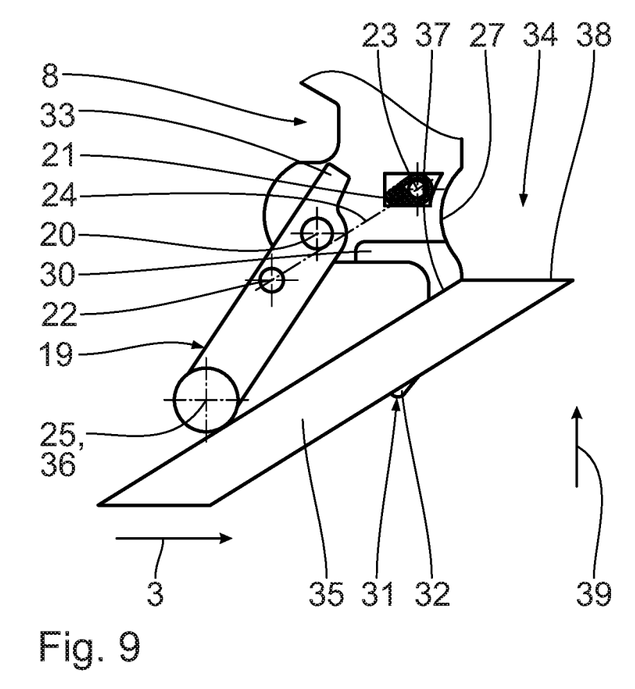
Figure 10:
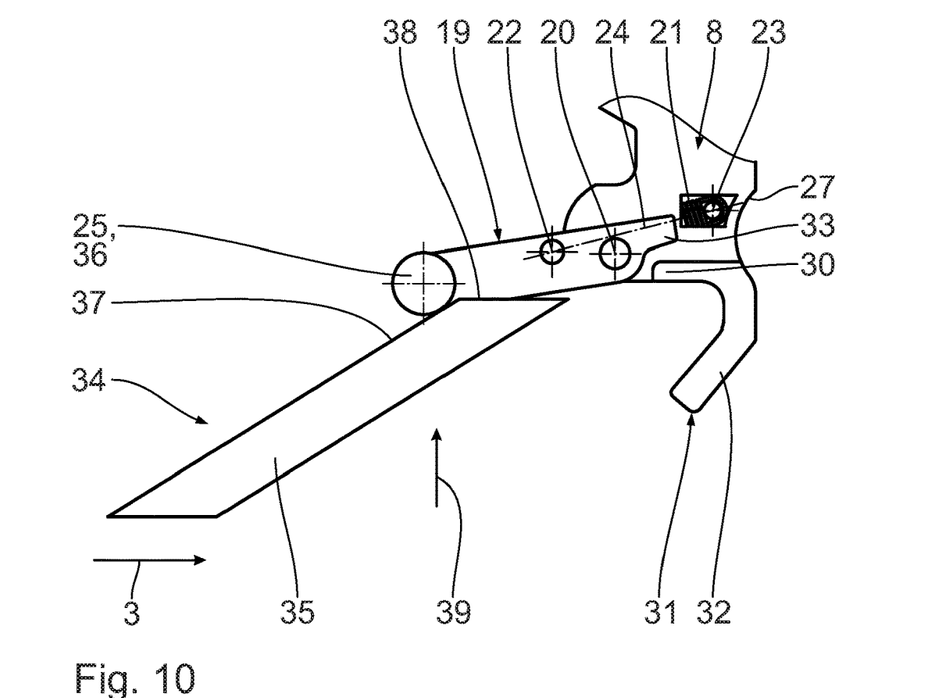
Figure 11:
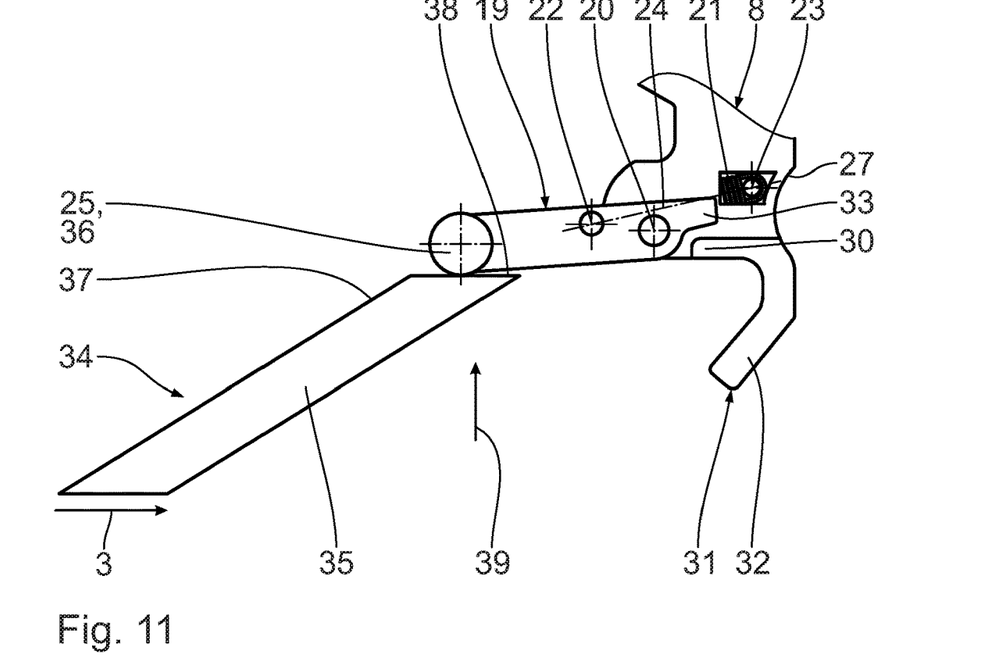

According to FIG. 8 the carrier part 8 is located in an intermediate position between the standard position and the working position. The position shown of the spacer lever 19 is closer to the standard position, wherein the spacer lever 19 is arranged spaced apart from the second stop element 31. If the carrier part 8 is conveyed in the direction of conveyance 3, the spacer lever 19 with the lateral portion 36 of the end region 25 comes into contact with the opening element 35. By the further conveyance of the carrier part 8 in the direction of conveyance 3, the spacer lever 19 is forcibly guided by the opening element 35 and displaced counter to the spring force of the force storage element 21 in the direction of the spaced-apart position, i.e. opened. According to FIGS. 8 to 12 the spacer lever 19 is pivoted in the clockwise direction relative to the pivot axis 20, in particular away from the second stop element 31.

The spacer lever 19 is pivoted even further by the further conveyance of the carrier part 8 in the direction of conveyance 3. The forced guidance of the spacer lever 19 is terminated when the end region 25 leaves the guide surface 37 and is arranged at the upper end 38 of the opening element 35. Since at this time the spacer lever 19 is already arranged in the over dead-centre position, which is turned toward the spaced-apart position, the spacer lever 19 is pivoted from the arrangement shown in FIG. 11 into the spaced-apart position shown in FIG. 12, as a result of the spring force produced by the force storage element 21. The pivoting movement of the spacer lever 19 is defined by the spacer lever 19 bearing with the protruding portion 33 against the first stop element 30. The spacer lever 19 is located in the spaced-apart position.

Figure 12:
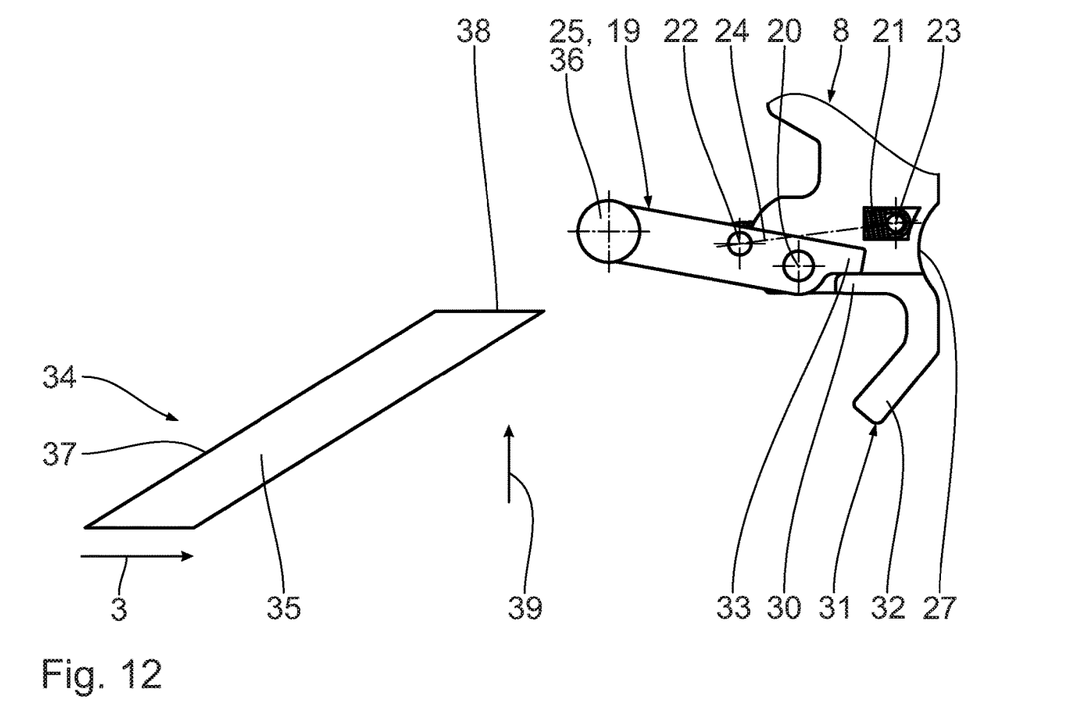

In particular, with the passively designed opening element 35, the opening station 34 permits an automated folding up of the spacer lever 19 into the spaced-apart position. The transfer of the spacer lever 19 into the spaced-apart position according to FIG. 12 is possible in an uncomplicated and reliable manner.

A closing station 40 is described in more detail hereinafter with reference to FIG. 13 to FIG. 17.

The closing station 40 is part of the suspended conveying system 1. The closing station 40 has a closing element 41 which is fixedly arranged in the suspended conveying system 1. The closing element 41 is fastened, in particular, to the conveyor rail, not shown in FIGS. 13 to 17. The closing element 41 is designed, in particular, as a fixed sliding surface.

The closing element 41 is arranged in the transverse direction 29 adjacent to the guide rail 2. The closing element 41 is arranged in the transverse direction 29 on the suspended conveying system 1, such that when displaced in the direction of conveyance 3 the spacer lever 19 with the lateral portion 36 of the end region 25 comes into contact with the closing element 41.

The closing element 41 has a closing surface 42, the spacer lever 19 being able to bear thereon with the lateral portion 36 of the end region 25. The closing surface 42 effects a forced guidance of the spacer lever 19 when the carrier part 8 is conveyed in the direction of conveyance 3. In a vertical plane which is oriented perpendicular to the transverse direction 29 and which corresponds to the drawing plane according to FIG. 13, the closing surface 42 has a contour which has a vertical component oriented counter to the vertical direction 39. The contour of the closing surface 42 is oriented so as to fall relative to the direction of conveyance 3.

According to the exemplary embodiment shown, the closing surface 42 is designed as a surface which is inclined in a linear manner with a second inclination angle $n_2$ relative to the direction of conveyance 3. The closing surface 42 may also be designed unevenly and have a contour which is designed in a non-linear, in particular curved manner, in particular degressively or progressively curved relative to the direction of conveyance 3.

The closing element 41 has a lower end 43. The lower end 43 defines the closing surface 42 downwardly, i.e. counter to the vertical direction 39. The lower end 43 is arranged, in particular, such that when the spacer lever 19 bears with the end region 25 against the lower end 43, the spacer lever is in an over dead-centre position which is turned toward the standard position.

The function of the closing station 40 is described in more detail hereinafter with reference to FIGS. 13 to 17.

Figure 13:
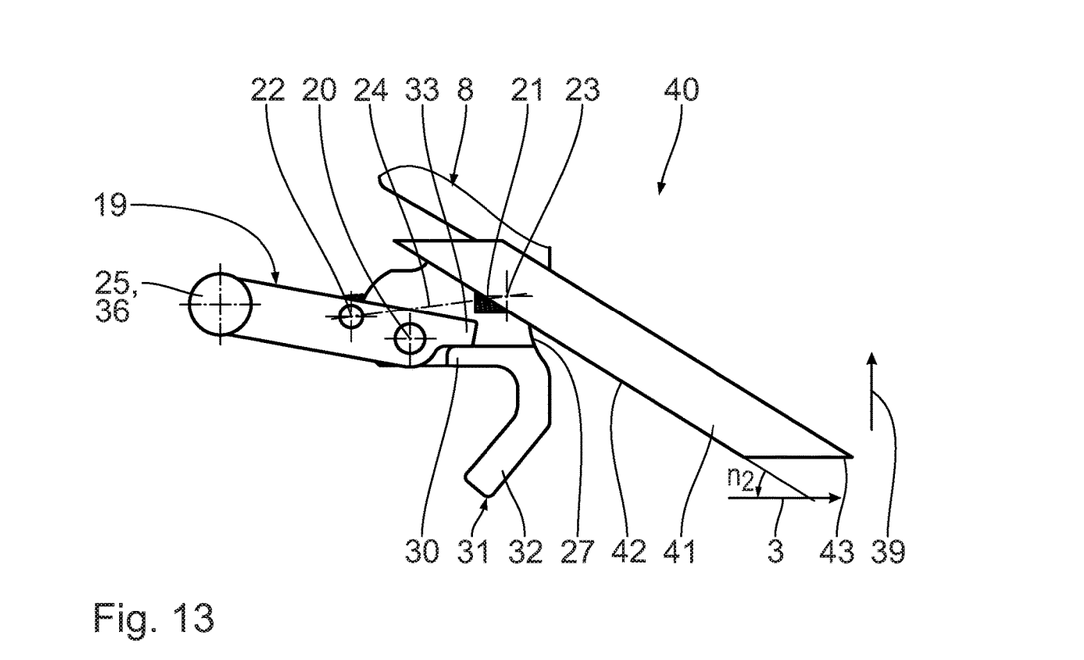
FIGS. 13 to 17 show schematic side views of a closing station of the suspended conveying system.
Figure 14:
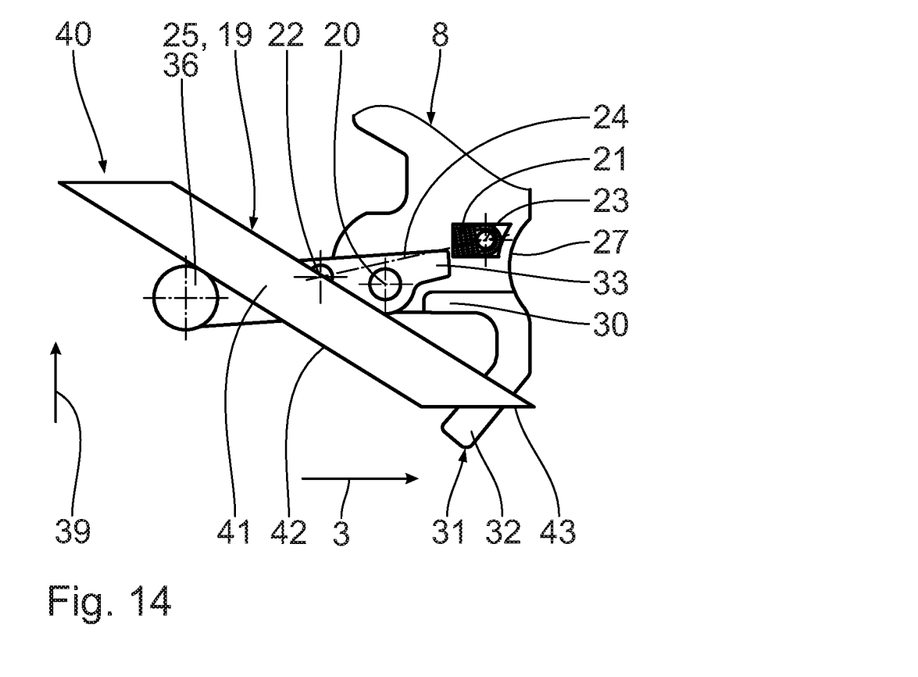
Figure 15:
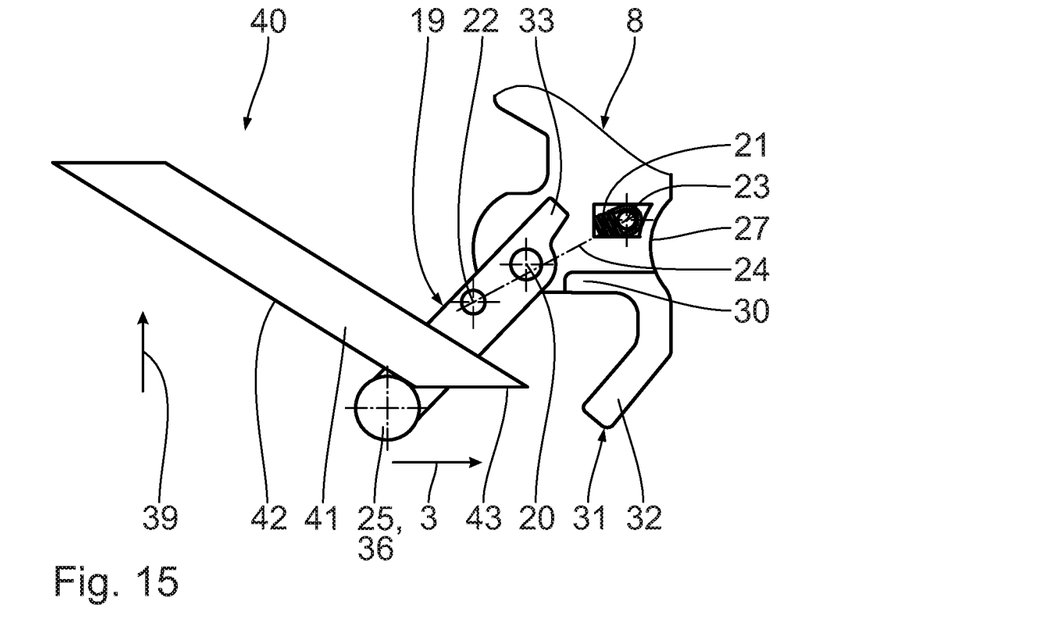

Starting from the arrangement in FIG. 13, in which the spacer lever 19 is in the open spaced-apart position, the carrier part 8 is conveyed in the direction of conveyance 3. The spacer lever 19 with the lateral portion 36 of the end region 25 comes into contact with the closing surface 42 of the closing element 41. A further displacement of the carrier part 8 in the direction of conveyance 3 effects a forced guidance of the spacer lever 19. The spacer lever 19 is pivoted by the closing surface 42 relative to the pivot axis 20 counter to the spring force of the force storage element 21 in the counterclockwise direction according to FIGS. 13 to 17.

Figure 16:
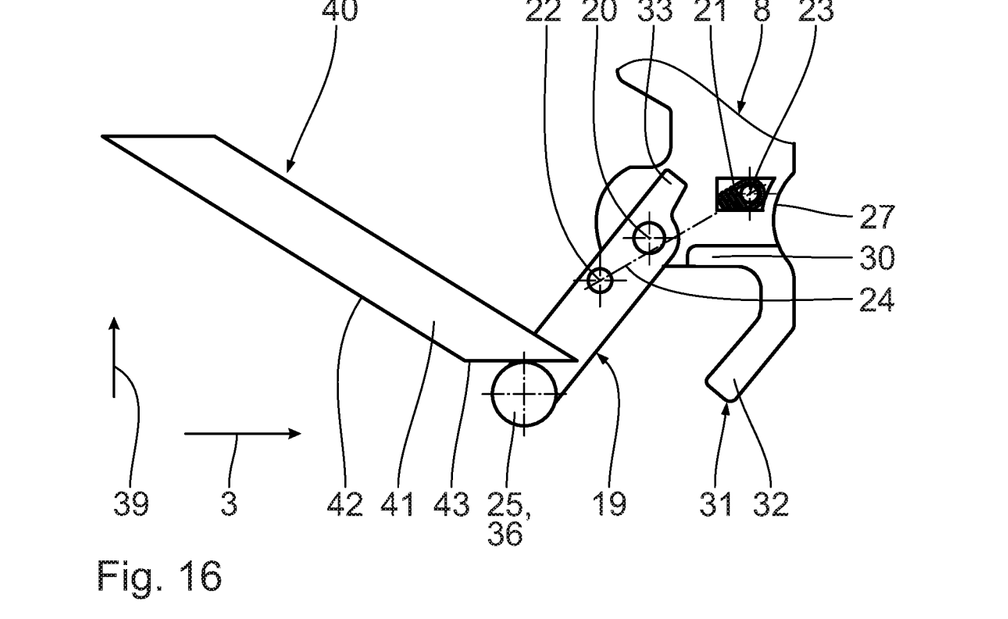

If the spacer lever 19 is arranged with the end region 25 on the lower end 43 of the closing element 41, according to FIG. 16, the spacer lever 19 is already in an over dead-centre position which is turned toward the standard position. From there the spacer lever 19 is pivoted automatically due to the spring force, i.e. without further forced guidance, into the standard position shown in FIG. 17.

Figure 17:
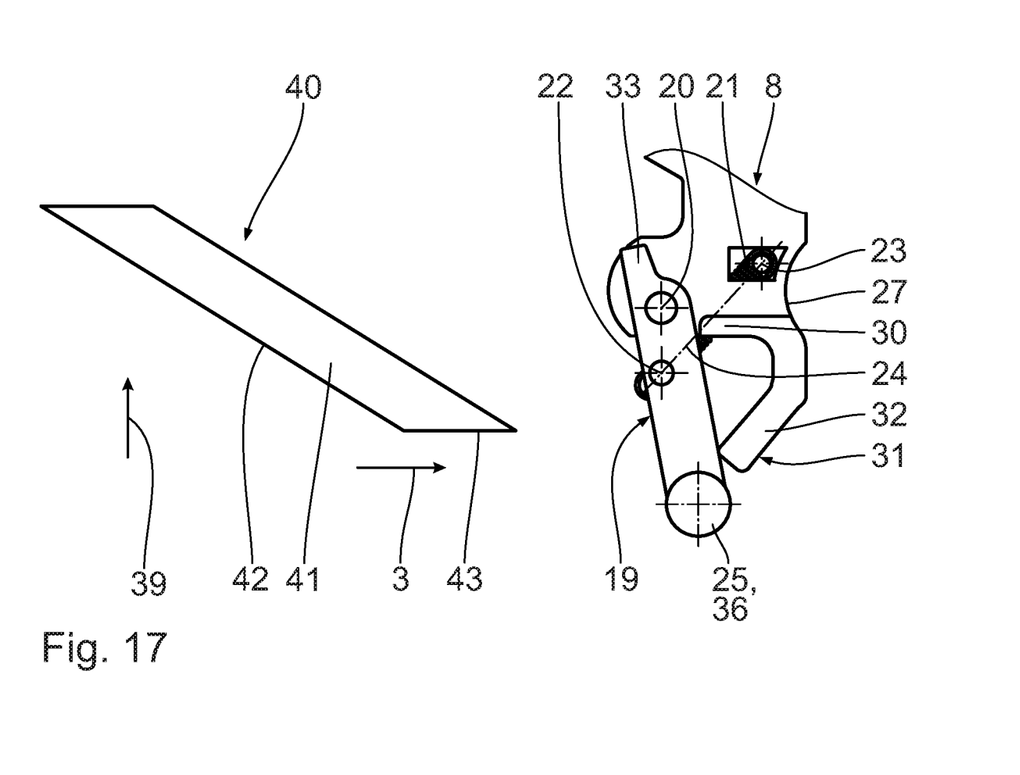

The closing station 40 with the passively designed closing element 41 permits a reliable and uncomplicated displacement of the spacer lever 19 into the standard position, shown in FIG. 17. The spacer lever may be folded directly into the standard position by means of the closing station 40.

What is claimed is:

1. A retaining element for retaining and conveying an object along a conveyor rail, the retaining element comprising:
    a carrier part having a width, the carrier part comprising an entrainment element for the entrainment of the carrier part by a drive element, the carrier part further comprising a receiver for receiving the object to be conveyed,
    a spacer lever pivotably articulated on the carrier part about a pivot axis and displaceable between a resting position in which the spacer lever is arranged within the width of the carrier part and a working position in which the spacer lever protrudes in the width direction of the carrier part, the retaining element being a roll adapter, the carrier part being configured in one piece, wherein the carrier part has a bearing surface which serves for a defined bearing of the spacer lever of a further retaining element.

2. The retaining element according to claim 1, wherein the spacer lever is arranged in the resting position and in the working position in each case in a stable manner on the carrier part.

3. The retaining element according to claim 1, further comprising a force storage element which is articulated at a first point of articulation on the spacer lever and at a second point of articulation on the carrier part, in each case pivotably.

4. The retaining element according to claim 1, further comprising at least one roller which is rotatably articulated about a rotational axis on the carrier part.

5. The retaining element according to claim 1, wherein the receiver is designed as a closed opening which is oriented transversely and perpendicular to the direction of conveyance.

6. The retaining element according to claim 1, wherein the carrier part has an identification element.

7. The retaining element according to claim 1, wherein the spacer lever in a free end region has a contact surface for bearing against the bearing surface of the adjacent retaining element.

8. The retaining element according to claim 1, wherein the carrier part comprises a planar surface, wherein a portion of the lever is located adjacent to the planar surface.

9. The retaining element according to claim 1, wherein the bearing surface defines a peripheral outer surface of the carrier part, the bearing surface being configured to face in a direction parallel to the conveying rail.

10. A retaining element for retaining and conveying an object along a conveyor rail, the retaining element comprising:
    a carrier part having a width, the carrier part comprising an entrainment element for the entrainment of the carrier part by a drive element, the carrier part further comprising a receiver for receiving the object to be conveyed;
    a spacer lever pivotably articulated on the carrier part about a pivot axis and displaceable between a resting position in which the spacer lever is arranged within the width of the carrier part and a working position in which the spacer lever protrudes in the width direction of the carrier part; and
    a force storage element articulated at a first point of articulation on the spacer lever and at a second point of articulation on the carrier part.

11. The retaining element according to claim 10, wherein the force storage element is a spring element.

12. The retaining element according to claim 11, wherein the spring element is arranged in the resting position and in the working position in each case in an over dead-center position.

13. The retaining element according to claim 10, wherein the points of articulation and the pivot axis form in the resting position and in the working position the vertices of at least one of a resting position triangle and a working position triangle in a plane perpendicular to the pivot axis.

14. A suspended conveying system comprising:
   at least one conveyor rail;
   a drive element; and
   a plurality of retaining elements, wherein at least one of the retaining elements comprises:
      a carrier part having a width, the carrier part comprising an entrainment element for the entrainment of the carrier part by the drive element, the carrier part further comprising a receiver for receiving the object to be conveyed;
      a spacer lever pivotably articulated on the carrier part about a pivot axis and displaceable between a resting position in which the spacer lever is arranged within the width of the carrier part and a working position in which the spacer lever protrudes in the width direction of the carrier part, the retaining element being a roll adapter, the carrier part being configured in one piece, wherein the carrier part has a bearing surface which serves for a defined bearing of the spacer lever of another one of the retaining elements.

15. The suspended conveying system according to claim 14, wherein the drive element is arranged so as to be integrated in the conveyor rail.

16. The suspended conveying system according to claim 14, further comprising an opening station for transferring the spacer lever into a spaced-apart position.

17. The suspended conveying system according to claim 14, wherein the opening station has an opening element which cooperates directly with the spacer lever.

18. The suspended conveying system according to claim 14, further comprising a closing station for transferring the spacer lever into a standard position.

19. The suspended conveying system according to claim 14, wherein the closing station has a closing element which cooperates directly with the spacer lever.

20. The suspended conveying system according to claim 14, wherein the carrier part comprises a planar surface, wherein a portion of the lever is located adjacent to the planar surface.

* * * * *